United States Patent
Heiler et al.

(10) Patent No.: US 10,394,255 B2
(45) Date of Patent: Aug. 27, 2019

(54) DIAGNOSTIC DEVICE AND METHOD FOR MONITORING FRICTIONAL BEHAVIOR IN A CONTROL LOOP

(71) Applicant: Siemens Aktiengesellschaft, Munich (DE)

(72) Inventors: Patrick Heiler, Waghaeusel (DE); Bernd-Markus Pfeiffer, Woerth (DE)

(73) Assignee: Siemens Aktiengesellschaft, Munich (DE)

( * ) Notice: Subject to any disclaimer, the term of this patent is extended or adjusted under 35 U.S.C. 154(b) by 422 days.

(21) Appl. No.: 15/207,030

(22) Filed: Jul. 11, 2016

(65) Prior Publication Data

US 2017/0023950 A1    Jan. 26, 2017

(30) Foreign Application Priority Data

Jul. 22, 2015   (EP) .................................. 15177789

(51) Int. Cl.
*G05D 7/06*   (2006.01)
*G05B 23/02*  (2006.01)
*G05B 17/02*  (2006.01)

(52) U.S. Cl.
CPC ............... *G05D 7/06* (2013.01); *G05B 17/02* (2013.01); *G05B 23/0254* (2013.01)

(58) Field of Classification Search
None
See application file for complete search history.

(56) References Cited

U.S. PATENT DOCUMENTS

| 2002/0040284 A1 | 4/2002 | Junk |
| 2004/0267679 A1* | 12/2004 | Fromherz ............ G06N 99/005 706/19 |
| 2005/0119865 A1 | 6/2005 | Bartsch |
| 2006/0074501 A1* | 4/2006 | Hartman .............. G05B 13/027 700/29 |

(Continued)

FOREIGN PATENT DOCUMENTS

| CN | 1645282 | 7/2005 |
| CN | 101517504 | 8/2009 |

(Continued)

OTHER PUBLICATIONS

Karra S. et al.: "Comprehensive methodology for detection and diagnosis of oscillatory control loops"; Control Engineering Practice, Pergamon Press, Oxford, GB; Bd. 17; Nr. 8; pp. 939-956; 2009.

(Continued)

*Primary Examiner* — Bernard G Lindsay
(74) *Attorney, Agent, or Firm* — Cozen O'Connor

(57) ABSTRACT

A diagnostic device and diagnostic method for monitoring the operation of a control loop with a controlled system having a valve as an actuator, wherein in the case of a substantially stepped profile of a setpoint, a linear submodel is identified, which is subsequently used, with a substantially constant setpoint, in order to identify a nonlinear submodel, which is arranged upstream of the linear submodel in a Hammerstein model for the controlled system so as to facilitate a quantitative assessment of the friction behavior of a valve with a comparatively low level of computing complexity.

7 Claims, 3 Drawing Sheets

(56) References Cited

U.S. PATENT DOCUMENTS

| | | | |
|---|---|---|---|
| 2007/0088446 A1* | 4/2007 | Srinivasan | G05D 7/005 |
| | | | 700/32 |
| 2008/0126861 A1 | 5/2008 | Zielinski et al. | |
| 2008/0243289 A1 | 10/2008 | Yelchuru et al. | |
| 2012/0323367 A1* | 12/2012 | MacArthur | G05B 13/048 |
| | | | 700/267 |
| 2013/0030554 A1* | 1/2013 | MacArthur | G05B 17/02 |
| | | | 700/29 |
| 2015/0277444 A1* | 10/2015 | Burns | G05D 7/0629 |
| | | | 700/282 |

FOREIGN PATENT DOCUMENTS

| | | |
|---|---|---|
| CN | 101743522 | 6/2010 |
| CN | 103092072 | 5/2013 |
| EP | 0907913 | 4/1999 |
| EP | 1 528 447 | 4/2008 |
| WO | WO 9741494 | 11/1997 |

OTHER PUBLICATIONS

Jelali et al.: "Estimation of valve stiction in control loops using separable least-squares and global search algorithms"; Journal of Process Control, Oxford, GB; Bd. 18; Nr. 7-8; pp. 632-642; 2008.

\* cited by examiner

DIAGNOSTIC DEVICE AND METHOD FOR MONITORING FRICTIONAL BEHAVIOR IN A CONTROL LOOP

BACKGROUND OF THE INVENTION

1. Field of the Invention

The invention relates to a diagnostic device and method for monitoring the operation of a control loop having a controlled system comprising a valve as an actuator.

2. Description of the Related Art

The maintenance and servicing of automated plants can be improved by monitoring the correct functioning of plant segments or components. In the case of insufficient reliability, measures for maintenance, servicing and fault correction can be targeted at the correct place in the plant. In numerous control loops in industrial plants, valves are used as actuators in controlled systems. The most common cause of problems and faults in control loops of this kind is increased friction in the valve, which can be caused by ageing of the seal, coatings on the seal or valve stem or due to packing gland seals that have been excessively tightened. Increased valve friction can impair the accuracy and control quality of the control loop. To enable measures for servicing or control optimization to be implemented in a timely and targeted selective manner at the correct place in the plant, in the case of the insufficient performance of individual control loops, it would be advantageous for the control quality of control loops to be monitored permanently and automatically.

EP 1 528 447 B1 discloses a diagnostic method for monitoring the operation of a control loop. In the case of a substantially stationary state, i.e., with an extensively constant setpoint selection, the variance of a sequence of actual data is determined as a stochastic characteristic and evaluated for an analysis of the state of the control loop. In the case of the excitation of the control loop corresponding to a setpoint jump, the relative overshoot or the settling ratio, i.e., the quotient of the rise time and settling time of the controlled variable are evaluated as deterministic features for an analysis of the control loop status.

The book "Detection and Diagnosis of Stiction in Control Loops" by Jelali, M. And Huang, B., Springer-Verlag, London, 2010 describes the assessment of the friction of valves used as actuators in control loops for control loop monitor. To elucidate the frictional effects observed thereby, FIG. 2 is a diagram showing an idealized characteristic curve. A manipulated variable u, which is output by a controller arranged upstream of the valve, is plotted on the abscissa and the actual value x of the actual valve setting is plotted on the ordinate. In the case of a valve that is free of frictional effects, according to a characteristic curve 20, the actual value x would correspond exactly to the manipulated variable u. Therefore, the characteristic curve 20 is shown as a straight line. If, on the other hand, a valve has experienced static friction and/or sliding friction, the actual valve setting x will differ from the manipulated variable u output by the controller. This behavior is elucidated with reference to a schematic characteristic curve 21. A parameter J designates the height of a jump after the valve has broken out of the static friction. A parameter S designates the slip and corresponds to the sum of the width of a dead band DB and the jump height of the parameter J. Two parameters fd and fs are an alternative form of describing the frictional behavior and can be used as alternatives to the above-explained parameters S and J. In this context, the parameter fs designates the normalized sum of all the frictional effects and the parameter fd the normalized residual Coulomb friction, where the residual friction relates to slip friction and may have a smooth transition to static friction. The width of the dead band DB results from the degree of the slip friction. The parameters S, J, fd and fs are normalized parameters, i.e., they relate to the size of the control range and can, for example, be expressed as a percentage of the control range. The parameter S indicates the necessary change to the control signal u that has to be applied to ensure that the valve moves on a reversal of the direction of movement. The relationship between the parameter sets is as follows:

$$S = fs + fd$$

and $$J = fs - fd.$$

The characteristic curve 21 of the frictional behavior describes a parallelogram. The segments extending parallel to the abscissa, in which, despite the varying manipulated variable u, the valve setting x remains unchanged, result from the static friction. As soon as the static friction has been overcome, the valve breaks free and executes a jump corresponding to the segments extending in parallel to the ordinate. Unlike the characteristic curve 20 without frictional effects, following the execution of a jump, a constant lag error is present. This results from the slip friction in the valve. If one of the two effects is not present, the characteristic curve 21 describing the frictional behavior of the valve is altered correspondingly. Similarly, an intensification of the frictional effects results in a corresponding change in the profile of the characteristic curve 21. The estimation of the aforementioned friction parameters is also helpful when there is no position feedback, i.e., the valve setting x cannot be measured directly.

Literature, such as the aforementioned book by Jelali and Huang, contains numerous methods for the identification of static friction. This literature frequently refers to static friction as "stiction" a portmanteau of the words "static" and "friction". Methods for the identification of stiction provide binary information on its presence, but are not always reliable. The method that is most suitable for identifying stiction is dependent upon the boundary conditions. However, there are no specific suggestions as to which method should be given preference for control loop monitoring.

The aforementioned book by Jelali and Huang describes the following methods for the identification of stiction:

Method a: uses typical profiles, such as valve setting jams, while manipulated variable u rises or falls.

Method b: uses the fact that a parallelogram forms in the scatter plot, a diagram showing profiles of the value pairs of manipulated variable u and actual value x of the valve setting acquired during the operation of a control loop.

Method c: determines the shape of the scatter plot of the position feedback from the manipulated variable u, and hence is an attempt to find typical profiles.

A cross correlation function (CCF) is a method that determines whether the CCF (cross correlation function) between the manipulated variable u and the actual value x of valve setting is even or uneven.

A curve-shape method is a method that compares the profile of the manipulated variable u with a sinusoidal signal and a triangular signal.

In the above list, the names of the individual methods were taken from the aforementioned book by Jelali and Huang and merely translated into German.

In order to estimate the intensity of the impacts of the frictional influences, the aforementioned book describes two methods involving a similar procedure under the heading "Stiction Estimation", but both of these require very high computing complexity. Both methods use the familiar Hammerstein model to simulate valve behavior mathematically via a model. In the Hammerstein model, the frictionless dynamic behavior of the valve is represented by a linear dynamic submodel. A nonlinear submodel arranged upstream thereof is intended to simulate nonlinear behavior of the valve, which is substantially based on the above-described frictional effects. According to literature, the parameters of the two submodels with which the lowest deviations between the behavior of the virtual model and that of the real valve are achieved should be estimated in a single method.

In this context, two optimization problems, one nonlinear and one linear, which are also coupled to one another, need to be solved simultaneously. For the identification of the Hammerstein model, i.e., in order to find the best possible parameter set, a global search for optimal parameters of the nonlinear part is performed. In this context, the method of least error squares, "least squares" estimation, is used to identify the optimal linear submodel again in each case for each iteration step.

In order to determine the nonlinear submodel, it is first necessary to select a model type suitable for the valve. He's model as depicted in FIG. 3.1 of the aforementioned book by Jelali and Huang is selected for an as realistic as possible representation of the valve behavior. This entails an optimization problem with the two parameters fs and fd. To restrict the search for parameters with the best possible conformance between the Hammerstein model and the real valve, the measured data and physical considerations can be used to define the following limits for the parameters fs and fd:

fs≥0, fd≥0: both parameters must be greater than or at least equal to 0 because negative values do not make any physical sense.

fs+fd<Smax: an upper limit Smax of the parameter S can be determined from the measured data as the difference between the maximum and minimum value of the manipulated variable u. Neither can the dead band DB be greater than this value.

fd≤fs: for physical reasons, the parameter S is greater or at least equal to the parameter J because the parameter J forms a part of the parameter S.

These limits result in a triangular search space 30, as shown in the diagram in FIG. 3, for the search for optimal parameters fs, plotted on the abscissa, and fd, plotted on the ordinate. Areas i, ii, iii and iv characterize different states of the valve with respect to the prevailing friction:

Area i: there is low friction—the valve is freely mobile,

Area ii: a comparatively large dead band DB and predominantly slip friction,

Area iii: so-called stick-slip behavior with predominantly static friction,

Area iv: a broad dead band DB with simultaneous stick-slip behavior.

The results of the model identification in all areas outside area i can be assessed as an indication of the presence of stiction that can have a negative impact on the control loop behavior.

To identify the model with which the best possible parameters of the Hammerstein model are sought, the aforementioned book by Jelali and Huang suggests a random search or genetic algorithms that unfavorably require a very high number of iterative steps. The practical implementation of the method named therein can also give rise to several problems:

A discrete-time least-squares estimation can entail various numerical problems, such as in connection with measuring noise or the choice of sampling interval, which complicate the estimation of the optimal parameters.

No previous findings are available with respect to the path dynamics and no suitable discrete-time model type is selected.

SUMMARY OF THE INVENTION

In view of the foregoing, it is an object of the present invention to provide a diagnostic device and a diagnostic method which place lower requirements on the computing capacity of a computing unit but still provide reliable estimated values for the prevailing friction in a valve.

This and other objects and advantages are achieved in accordance with the invention by a diagnostic device, a diagnostic method, a computer program for implementing the diagnostic method and a corresponding computer program product by which a quantitative estimation of the friction in a valve is advantageously enabled during the course of data-based control loop monitoring using measurements of a controller manipulated variable, which generally corresponds to a specification of a valve setting, and a controller actual value. This could, for example, involve a control loop for a flow or pressure and no measurement of the actual valve setting, i.e., "position feedback", is required for this. Due to the comparatively low computing complexity, the analysis can be performed while the plant is in operation and it does not affect production. A quantitative assessment of the friction helps to improve the control quality of the control loop in question by servicing measures on the valve when the need therefor is identified and hence to increase the productivity and efficiency of the plant. In this context, advantageously, only data that occurs in regular process operation is used in the sense of a non-invasive diagnosis. A process running on an automated plant is not affected by the diagnosis and can continue to run undisturbed during the performance of a diagnosis.

Advantageously, the problem of the estimation of a Hammerstein model for a controlled system with a valve is divided into two easier-to-solve subproblems:

a) the estimation of the linear dynamic submodel using a setpoint jump as an excitation function with which the impacts of friction are negligible and b) the estimation of a nonlinear submodel using a time range with a constant setpoint at which the impacts of friction dominate the valve behavior and, hence, the behavior of the entire controlled system comprising the valve and downstream flow mechanics, such as the impact of the valve setting on a flow.

In practice, this division renders the estimation of the Hammerstein model from real data applicable even with a comparatively low computing capacity and provides sufficient accuracy of the estimated parameters sufficient for the evaluation of the impacts of friction.

In a particularly advantageous embodiment of the diagnosis, parameters of a first-order time delay element are estimated as a linear submodel for the identification of the linear submodel. The direct estimation of a low order continuous-time model for the linear submodel instead of higher order discrete-time models avoids problems with the definition of the model sampling time and reduces the number of parameters to be estimated so that the numerical stability of the estimation is improved overall.

In accordance with a further particularly advantageous embodiment of the invention, a quantitative determination of the valve friction by the identification of the nonlinear submodel is not performed continuously, but is initiated when a previous identification method performed, which has a simpler computational complexity, has identified increased static friction. Hence, the comparatively complex estimation of the nonlinear submodel for the friction behavior of the valve is advantageously only performed when required. Therefore, simple binary identification methods known, for example, from the aforementioned book by Jelali and Huang are initially used to find the control loops for which stiction is suspected. Only if at least one of the total of five simple identification methods gives rise to suspicion is the estimation of the nonlinear submodel, which requires much more computing time, started in order to provide information on the intensity of the impacts of friction via the parameters obtained during the identification of the submodel.

To find the global minimum of the deviations between the model and the real valve, a method using a random search over the entire search space and alternatively thereto a method for fine sectioning of the search space would require a comparatively high number of passes and would entail a correspondingly high computing complexity. Therefore, in order to reduce the computing complexity, in a further particularly advantageous embodiment of the invention, a search space enclosed by two parameters of the nonlinear submodel, such as the parameters fd and fs or the parameters S and J, is divided into a plurality of adjacent subspaces. In the subspaces formed thereby, it is in each case possible, such as via a random search, to determine the parameter pair providing the best conformance between the nonlinear submodel and the real valve in the respective subspace. Each of the plurality of parameter pairs obtained in the subspace can now be used with comparatively low computing complexity to determine the parameter pair with the best quality in the entire search space.

The diagnostic device can be advantageously formed in the same way as that already known EP 1 528 447 B1 as a software function block, which can be switched in a graphical operator interface of an engineering system with function blocks of the control loop and can be loaded into an automation unit for the operation of the diagnostic device. The parameters calculated, such as the parameters S and J or the parameters fs and fd, are then displayed on a "faceplate" for the implementation of a man-machine interface on a control and monitoring device of the automated plant. If desired, an operator can make a change to the parameterization, such as the grid width on the division of the search space, the input of reference values for the generation of an alarm if the friction is impermissibly high etc, on this control and monitoring system.

Particularly advantageously, the diagnostic device in accordance with the invention can be implemented for the operation of a control loop in a software environment for cloud-based control loop monitoring. One example of a software environment of this kind is, for example, the data-based remote service "Control Performance Analytics" from Siemens AG. Data from customer plants is collected with the aid of software agents, aggregated and sent to a Siemens Service Operation Center where they are stored on a remote service computer. Here, the data is semi-automatically evaluated with the aid of different "data analytics" software applications. If required, experts specially trained in the remote service are able to work on this database in a highly efficient manner. The results of the data analysis can be displayed on a monitor of the remote service computer and/or provided on a SharePoint site so that they can be viewed by the end user, i.e., the operator of the automated plant, such as in a browser.

The diagnostic method is hence preferably implemented in software or in a combination of software and hardware so that the invention also relates to a computer program with computer-executable program-code instructions for the implementation of the diagnostic method. In this connection, the invention also relates to a computer program product, in particular a data carrier or a storage medium, with a computer-executable computer program of this kind. As described above, such a computer program can be provided in a memory of an automation device or loaded thereinto so that, during the operation of the automation device, the operation of a control loop is automatically monitored or, in the case of cloud-based monitoring of control loops, the computer program can be provided in a memory of a remote service computers or loaded thereinto.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The following describes the invention, embodiments and advantages in more detail with reference to the drawings which depict an exemplary embodiment of the invention, in which.

DETAILED DESCRIPTION OF THE EXEMPLARY EMBODIMENTS

Figure 1:
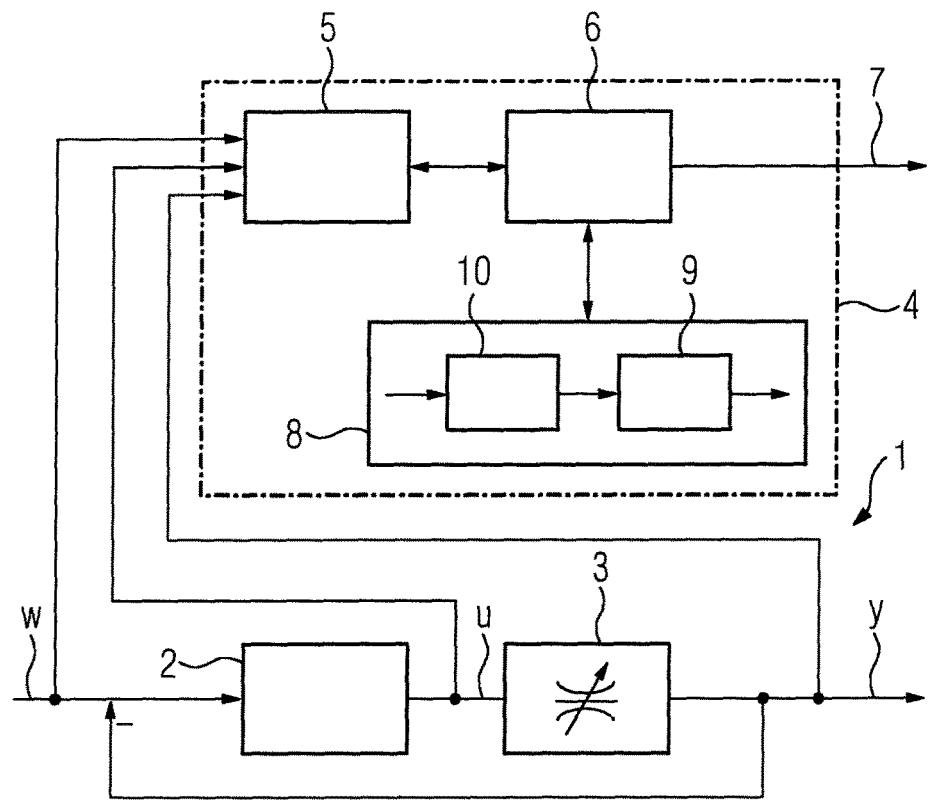
FIG. 1 is a block diagram of a control loop with a diagnostic device in accordance with the invention.

The same parts are given the same reference characters in the figures.

With reference to FIG. 1, a control loop 1 to be monitored consists of a controller 2 and a process 3, which is frequently also called a controlled system, and comprises a valve as an actuator. The control loop 1 can, for example, be a flow controller. In this case, the setpoint w is specified for a flow value, which is to be set via the valve. An actual value y is acquired at the output of the process 3 and fed back to form a control deviation. The controller 2 uses the control deviation to calculate a manipulated variable u to set the flow at the process 3. The manipulated variable u can, for example, directly entail the specification of a desired valve setting.

If, unlike the case in the exemplary embodiment depicted, the control loop is a position regulator, the setpoint is a positional setting and the actual value corresponds directly to the position of the valve used in the process.

Figure 2:
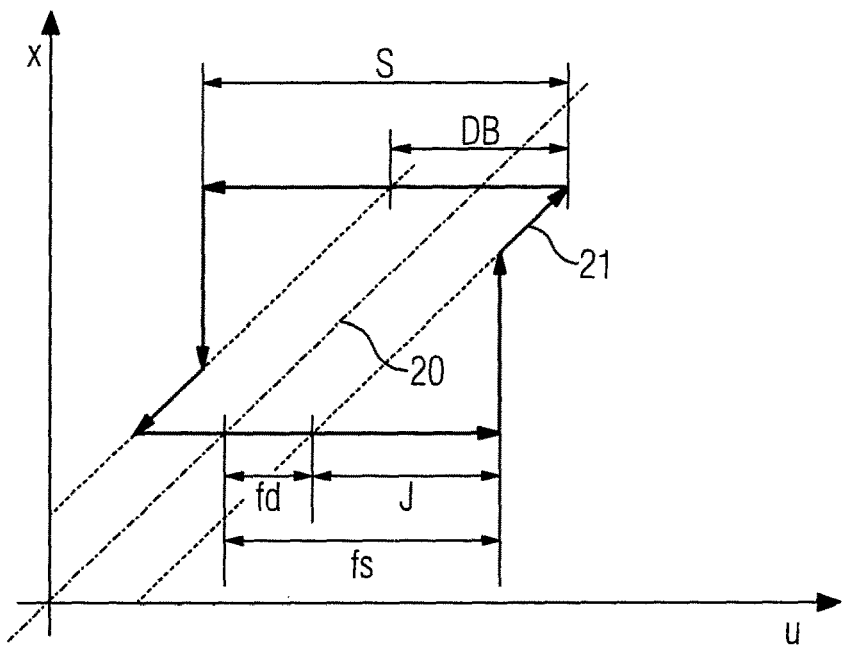
FIG. 2 is a diagram to explain the friction behavior of a valve.

A diagnostic device 4 monitors the operation of the control loop 1 and any possible further control loops of an automated plant, which are not shown in FIG. 1 for purposes of clarity, for disturbances. Such disturbances can be particularly caused by increased friction in the valve used in the process 3. For monitoring operation of the control loop 1, temporal sequences of data for the setpoint w, the manipulated variable u and the actual value x are stored in a data memory 5. An evaluation device 6 now uses this data as the basis for the calculation and output of parameters 7 of a model 8, which are characteristic of the status of the valve and hence of the operation of the control loop. The model 8 is a Hammerstein model which, as already explained in the introduction, includes a linear submodel 9 for the dynamic behavior of the process 3 and a nonlinear submodel 10 arranged upstream thereof for the nonlinear behavior of the process 3, which is substantially determined by the frictional behavior of the valve. During the identification of the submodels 9 and 10 performed by the evaluation device 6, the model parameters are calculated with which the virtual model 8 most closely simulates the real process 3 comprising a real valve as an actuator. The parameters fs and fd mentioned in the introduction for the characterization of the friction prevailing in the valve and explained in more detail with reference to FIG. 2 are of special interest, for example. With knowledge of the friction, it is then advantageously possible to ascertain whether the friction has reached a level that is noticeable as a disturbance in the control loop 1 or it is possible to evaluate how great the action of the friction on the control loop behavior actually is.

To enable the diagnosis to occur in real time, i.e., simultaneously with the operation of the control loop, and hence the required computing capacity is low, the diagnostic device, which can also be configured to monitor further control loops, which are not shown in FIG. 1, initially searches with simple, binary identification methods for the control loops in an automated plant for which there is a suspicion of stiction. If at least one of the simple identification methods, such as are known from the book by Jelali and Huang, gives rise to this suspicion, the estimation of parameters of the nonlinear submodel 10, which is much more computing-time-intensive than the simple identification methods, is started in order to ascertain the degree of the friction. The estimation of the parameters of the nonlinear submodel 10 is in particular decisively simplified by the fact that the linear dynamic submodel 9 is initially identified by estimating its parameters in the case of a setpoint jump, and that the nonlinear submodel 10 is subsequently identified with knowledge of a realistic linear submodel 9 with data with a substantially constant setpoint w. This enables a highly accurate estimation result to be achieved with a comparatively short calculation time. The parameters of the nonlinear submodel 10 are estimated with a data segment with a constant setpoint w. As a result, the types of data used are those with which the impacts of the friction are particularly clearly visible. It is namely identified from simulations and real measurements on faulty valves that the increased friction has only little impact on the behavior of the control loop 1 in the case of a setpoint jump because, in this case, the force for controlling the valve generally exceeds its static friction. For the same reason, the linear submodel 10 can usually be estimated sufficiently accurately and substantially independently of friction when evaluating the setpoint jump data. In this context, the identification of the linear submodel 9 can advantageously be performed with functions of the linear model identification independently of the parameters of the nonlinear submodel. The direct estimation of low-order continuous-time models with a direct local optimization method is advantageous for this purpose. The optimization problem to be solved for the identification of the nonlinear submodel 10 is highly nonlinear and a quality function used in this context has a plurality of local extrema in a search space, such as the triangular search space 30 shown in FIG. 3. In order to reduce the computing complexity of the search, the conventional random search method and the method for the sectioning of the search space are combined with one another to find the global minimum. In this context, a grid of quadratic elements is initially placed over the triangular search space 30 shown in FIG. 3. A random search is then performed for each grid point in a small quadratic area and with few iterations. In this context, the edge length of the respective is determined by the grid point spacing. This enables the entire search space 30 to be covered in order to solve the optimization problem. The random search can generally find an optimum in a small search space, i.e., in a quadratic element of the grid, after only a few steps. The described combination of sectioning and random search leads to a savings in complexity of about 30%.

The random search can, for example, be performed using one of the following possibilities:

On the one hand, the new point about which the search is performed is always replaced by a better one when it is found as a result of which the search space in which the new points are sought changes permanently.

It is also possible to always keep the search space for the random search constant and only to store new points.

It has been found that the second embodiment is more effective with the present optimization problem since, the displacement of the individual small search spaces in the grid could give rise to overlaps and hence some of the points could be evaluated several times.

The global optimum over the entire search space is finally the point with the best quality function of the local optima found in the individual subspaces, i.e., the above-described quadratic elements of the grid.

During the estimation of the parameters of the Hammerstein model, the quadratic model error V is calculated in accordance with the following relationship:

$$V=\Sigma_{i=1}^{N}(y_{sim}-y)^2, \qquad \text{Eq. 1}$$

where N is the number of measured values, $y_{sim}$ is the actual value from the simulation, and y is the actual value in the real process 3.

To obtain the actual value $y_{sim}$, generated virtually by the Hammerstein model 8 the frictional behavior of the controlled system 3 including the valve is initially simulated with the nonlinear submodel 10. The result can then be used to generate the actual value $y_{sim}$ with the linear submodel 9.

The steady-state condition of the control loop 1 is not known. As a result, it is necessary to accept a certain transient effect. To exclude the effect of the transient condition from the calculation of the quality function, following a setpoint jump, a prespecified number of data types are ignored at the start of the data segment considered in each case, such as 10% of the data. The remaining 90% of the data is used to calculate a goodness of fit for the quality of the model quality function using the following relationship:

$$\text{Fit} = 100 * \frac{1 - \|y_{sim} - y\|}{\|y - \mu_y\|}.\qquad \text{Eq. 2}$$

Figure 3:
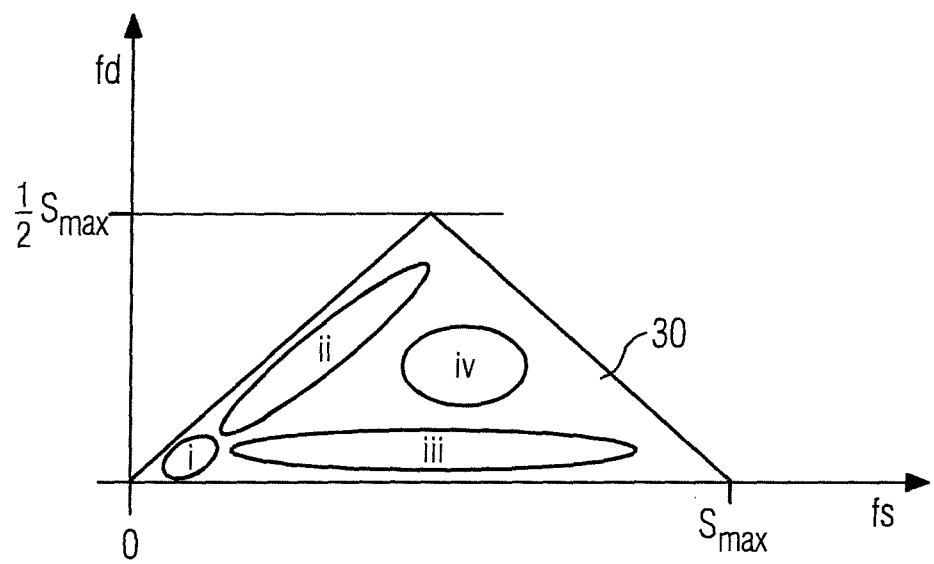
FIG. 3 is a search space for the parameter search for a nonlinear submodel.
Figure 4:
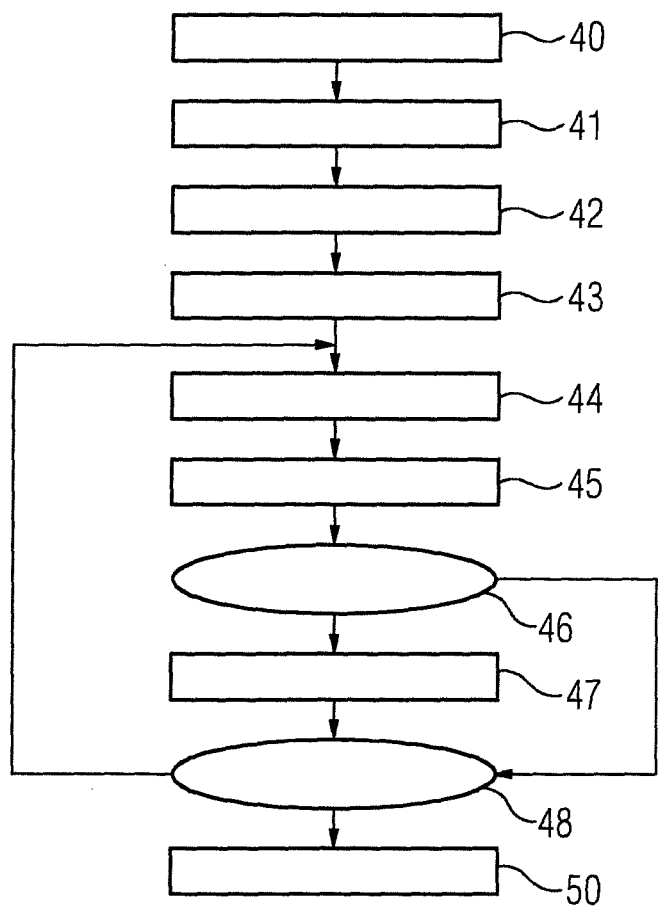
FIG. 4 is a flow diagram of a quantitative friction estimation.

FIG. 4 is a flow diagram showing a method which can be used for the operation of the control loop 1 (FIG. 1) with a controlled system 3 comprising a valve as an actuator and for the quantitative assessment of the friction of the valve. Unless already performed for other reasons within the context of a control loop analysis, in step 40, the linear submodel 9 for the dynamic behavior of the process 3 is estimated which, for example, has the structure of a first-order time delay element and is used in the Hammerstein model 8. To this end, a data record is used that is recorded at substantially the same time as a setpoint jump, i.e., segments of the sequences of data of the manipulated variable u and the actual value y for a period with a substantially stepped profile of the setpoint w. In step 41, a second data record, an area which is as long as possible with a constant setpoint w, is determined and the actual data are cleaned of their mean value. Simple analysis is used to determine a maximum value Smax of the parameter S from the data record determined that is used to define the triangular search space 30 (FIG. 3). In step 42, the starting values of the random search, such as 1000 pieces, are distributed uniformly in the search space 30. An optimization loop, which is entered after step 43, is used to determine the optimum parameters for each subspace of the search space 30 defined in step 42 and is passed through for each of the starting values. In this context, a random search is performed in a small, fixed search radius. During the positioning of the new points performed in step 44, the aforementioned boundaries of the parameters are always adhered to. In step 45, the parameters corresponding to the respective point and segments of the sequences of data of the manipulated variable u and of the actual value y for a period with a substantially constant setpoint w are used to calculate default values for the Hammerstein model 8 of the process 3 and in this way to generate simulated actual values y.sub.sim, which are used to calculate the quality of the respective model. Following a question 46, if an improvement has been achieved, in step 47, the new point is stored as a local minimum. If, in a question 48, an abort criterion for passing through the loop is not yet satisfied, the loop will be passed through again starting with step 44. When the above-described calculations have been performed for all subspaces, all local optima are present. The optimum parameters fs and fd of the nonlinear submodel 10 are calculated from the best point of all the subspaces, i.e., from the global optimum. In addition, as explained above, it is also possible to determine the parameters S and J. Advantageously, the parameters S and J are expressed as a percentage of the control range so that, for example, a value for the parameter S of 4% means that the controller 2 has to change the manipulated variable u by 4% before the valve reacts in the process 3. In a last step 50, the above-described goodness of fit 8 for the quality of the Hammerstein model is calculated.

Hence, the monitoring of control loops with respect to valve friction is advantageously divided into two easy-to-solve tasks:

a) the determination of the suspected control loops from a large number of candidates using simple identification methods which only ascertain binary information relating to suspected stiction, and b) the quantification of the friction present to enable an evaluation of its impact on control loop behavior by the parameter estimation for a nonlinear submodel describing the friction behavior.

This division means the computing-time intensive calculations of the model identification only have to be performed for a limited number of control loops with which a specific initial suspicion was previously identified.

The plant operator is able to derive logical and targeted planning for servicing measures from the parameters fd and fs or S and J to improve the control quality if necessary and to increase the efficiency of the plant.

Figure 5:
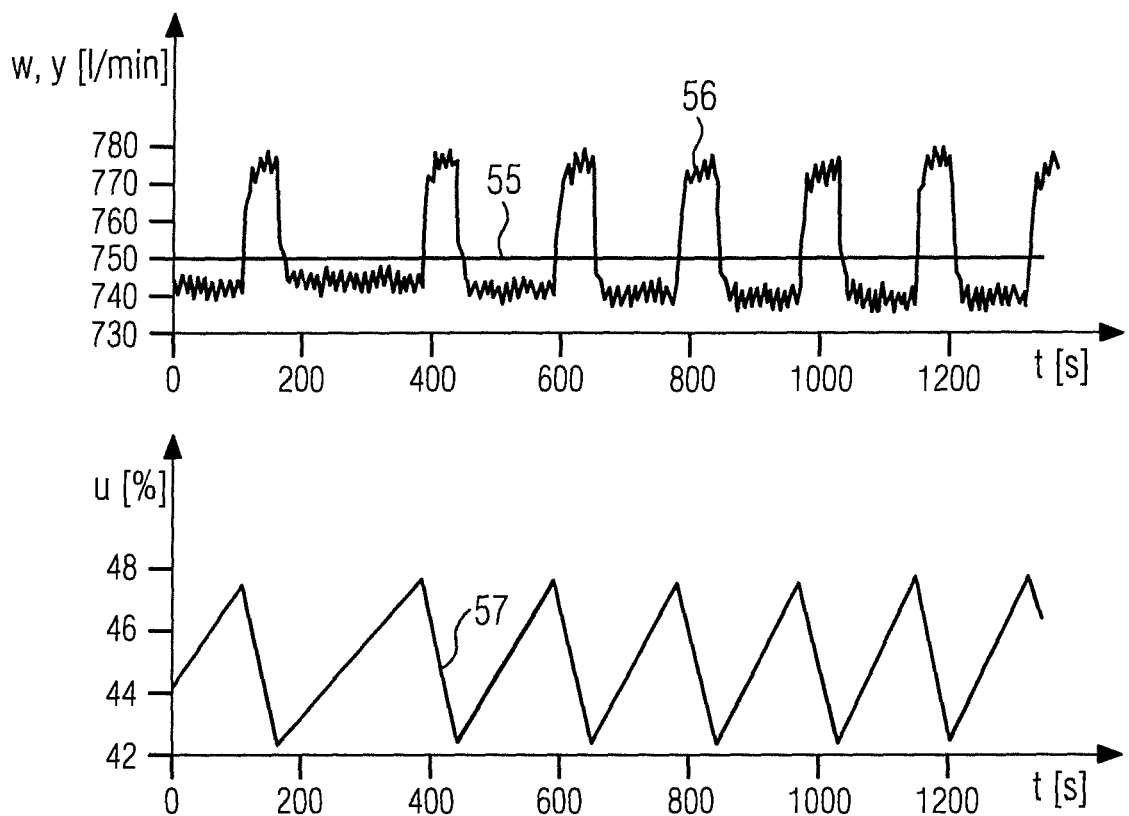
FIG. 5 is sequences of actual data and manipulated variable data obtained in measurements on a flow control loop.
Figure 6:
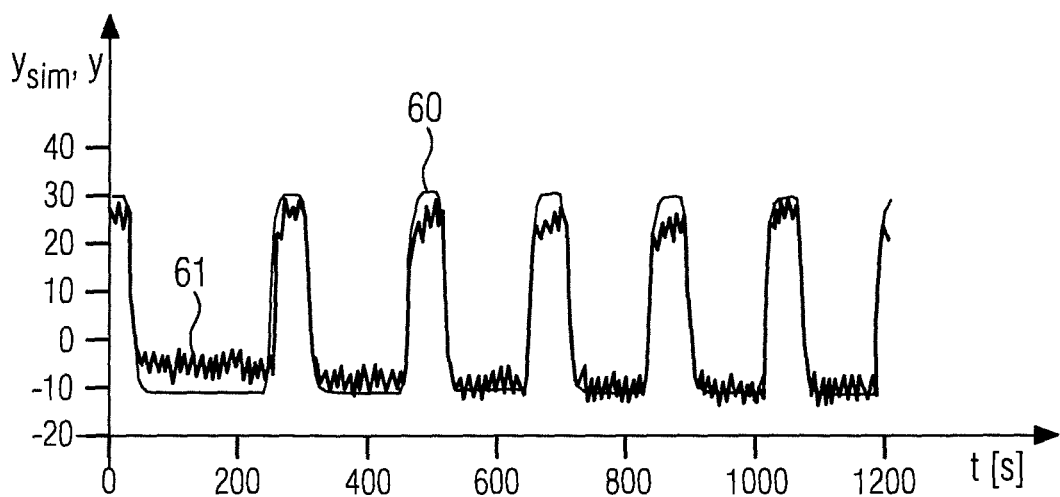
FIG. 6 is a diagram for comparing the actual data of a real controlled system with the simulated actual data generated by an estimated Hammerstein model.

The impacts of increased friction on the control loop behavior are clearly evident in the following with reference to FIGS. 5 and 6, which contain data recorded in a real flow control loop. The top diagram in FIG. 5 shows the profile 55 of the setpoint w and the profile 56 of the actual value y, the lower diagram in FIG. 5 shows the profile 57 of the manipulated variable u. In each case, the time t in seconds is plotted on the abscissa, the flow is plotted on the ordinate of the upper diagram and the percentage of the manipulated variable u is plotted on the ordinate of the lower diagram. In the case of a constant setpoint selection corresponding to the profile 55, it is possible to identify the saw-tooth-shaped profile 57 of the manipulated variable u typical of stiction and the approximately rectangular profile 56 of the actual value y in the control loop.

In this specific example, three of the five simple identification methods used initially suggest suspected stiction. Consequently, it was considered advisable to identify a Hammerstein model. In order to estimate the parameters of the model, a linear submodel, in the present case a PT1 element with the parameters k=7.2 and t=15.8 s, was initially identified at a setpoint jump. A subsequent identification of the nonlinear submodel provided the parameters J=3.1 and S=4.2 as model parameters with the best conformance between the Hammerstein model and the real process. To elucidate the result, FIG. 6 shows the profiles 60 and 61 of the simulated actual value ysim and/or the actual value y of the real process. The monitoring method confirms the suspicion obtained from the simple identification method that this is actually stiction. The values determined for the parameters J and S are in an area typical of stiction. In accordance with the parameter S, the manipulated variable u has to change by more than 4% before the valve moves at all to change the flow. The cause is, for example, impermissibly high static friction in a packing gland seal, which can be rectified by corresponding maintenance measures in the next maintenance cycle.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements which perform substantially the same function in substantially the same way to achieve the same results are within the scope of the invention. Moreover, it should be recognized that structures and/or elements shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A diagnostic device for operating a control loop having a controlled system comprising a valve as an actuator, the diagnostic device comprising:
    a data memory storing temporal sequences of data for a setpoint, a manipulated variable and an actual value of the control loop; and
    an evaluation device configured to select at least first segments of the temporal sequences for a period with a stepped profile of the setpoint and second segments of the temporal sequences for a period with a constant setpoint;
    wherein the evaluation device is further configured to use the first segments of the temporal sequences to identify a linear submodel for dynamic behavior of the controlled system comprising the valve as the actuator;
    wherein the evaluation device is further configured to use the second segments of the temporal sequences and the linear submodel to identify a nonlinear submodel for frictional behavior of the controlled system comprising the valve as the actuator;
    wherein an output of the nonlinear submodel is input to the identified linear submodel,
    wherein the evaluation device is further configured to use an evaluation of the temporal sequences to determine a presence of a level of static friction of the valve and, if the level of static friction is exceeded, to determine static friction of the valve quantitatively by identification of the nonlinear submodel; and
    wherein the control loop having the controlled system comprising the valve as the actuator is operated and monitored to obtain the quantitative assessment of the frictional behavior of the controlled system comprising the valve as the actuator.

2. The diagnostic device as claimed in claim 1, wherein the evaluation device is further configured to estimate parameters of a first-order time delay element as a linear submodel to identify the linear submodel.

3. The diagnostic device as claimed in claim 1, wherein in order to identify the nonlinear submodel, the evaluation device is further configured to divide a search space, which is enclosed by two parameters of the nonlinear submodel, into a plurality of adjacent subspaces, determine in each case in the subspaces formed by the parameter pair within each case an optimal quality of the nonlinear submodel and use the parameter pairs determined in the subspaces to establish the parameter pair with the optimal quality in the search space.

4. The diagnostic device as claimed in claim 1, wherein at least the data memory and the evaluation device are implemented by software on a remote service computer for remote diagnosis of the control loop.

5. A diagnostic method for monitoring a control loop having a controlled system comprising a valve as an actuator, the method comprising:
    storing, in a data memory, temporal sequences of data for a set point, a manipulated variable and an actual value of the control loop;
    selecting, by an evaluation device, at least first segments of the temporal sequences for a period with a stepped profile of the setpoint and second segments of the temporal sequences for a period with a constant setpoint;
    identifying, by the evaluation device, a linear submodel for dynamic behavior of the controlled system comprising the valve as the actuator based on the first segments of the temporal sequences;
    identifying, by the evaluation device, a nonlinear submodel for frictional behavior of the controlled system comprising the valve as the actuator based on the second segments of the temporal sequences and the linear submodel, wherein an output of the nonlinear submodel is input to the identified linear submodel,
    utilizing, by the evaluation device, an evaluation of the temporal sequences to determine a presence of a level of static friction of the valve and, if the level of static friction is exceeded, to determine static friction of the valve quantitatively by identification of the nonlinear submodel; and
    operating and monitoring the control loop having the controlled system comprising the valve as the actuator to obtain the quantitative assessment of the frictional behavior of the controlled system comprising the valve as the actuator.

6. A non-transitory computer program product encoded with computer-executable program-code instructions which, when executed by a computer, cause monitoring of a control loop having a controlled system comprising a valve as an actuator, comprising:
    program-code instructions for storing, in a data memory, temporal sequences of data for a set point, a manipulated variable and an actual value of the control loop;
    program-code instructions for selecting, by an evaluation device, at least first segments of the temporal sequences for a period with a stepped profile of the setpoint and second segments of the temporal sequences for a period with a constant setpoint;
    program-code instructions for identifying, by the evaluation device, a linear submodel for dynamic behavior of the controlled system comprising the valve as the actuator based on the first segments of the temporal sequences; and
    program-code instructions for identifying, by the evaluation device, a nonlinear submodel for frictional behavior of the controlled system comprising the valve as the actuator based on the second segments of the temporal sequences and the linear submodel, wherein an output of the nonlinear submodel is input to the identified linear submodel;
    program-code instructions for operating the evaluation device to use an evaluation of the temporal sequences to determine a presence of a level of static friction of the valve and, if the level of static friction is exceeded, to determine static friction of the valve quantitatively by identification of the nonlinear submodel; and
    program code instructions for operating and monitoring the control loop having the controlled system comprising the valve as the actuator to obtain ft the quantitative assessment of the frictional behavior of the controlled system comprising the valve as the actuator.

7. The non-transitory computer program product as claimed in claim 6, wherein the non-transitory computer program product comprises one of a data carrier and storage medium.

* * * * *